United States Patent [19]

Christian et al.

[11] Patent Number: 5,180,122
[45] Date of Patent: Jan. 19, 1993

[54] APPARATUS FOR DEICING

[75] Inventors: Donald J. Christian, Fremont, Calif.; Graham D. Robertson, Orlando, Fla.; James M. Tucci, Campbell; Michael J. Westcott, San Jose, both of Calif.

[73] Assignee: FMC Corporation, Chicago, Ill.

[21] Appl. No.: 698,033

[22] Filed: May 10, 1991

[51] Int. Cl.$^5$ ............................................. B64D 15/22
[52] U.S. Cl. ................................. 244/134 F; 340/583; 340/905; 358/95; 244/134 R
[58] Field of Search ............... 340/903, 904, 905, 945, 340/962, 580, 583, 582, 601; 358/108, 103, 95, 93, 99, 101, 107; 356/5, 338; 250/239, 339; 244/134 R-134 F

[56] References Cited

U.S. PATENT DOCUMENTS

| | | | |
|---|---|---|---|
| Re. 29,031 | 11/1976 | Irving et al. | 209/111.6 |
| 3,206,022 | 9/1965 | Roberts et al. | 209/74 |
| 3,243,123 | 3/1966 | Inghram et al. | 239/124 |
| 3,540,025 | 11/1970 | Levin et al. | 244/134 F |
| 3,612,075 | 10/1971 | Cook | 244/134 C |
| 3,723,648 | 3/1973 | Cornsweet | 358/95 |
| 3,735,136 | 5/1973 | Flint | 250/83.3 H |
| 3,770,111 | 11/1973 | Greenwood et al. | 209/73 |
| 4,274,091 | 6/1981 | Decker | 340/905 |
| 4,281,933 | 8/1981 | Houston et al. | 356/425 |
| 4,593,533 | 6/1986 | Alsenz | 62/140 |
| 4,690,553 | 9/1987 | Fukamizu et al. | 340/583 |
| 4,723,733 | 2/1988 | McClinchy | 244/134 R |
| 4,760,272 | 7/1988 | Wang | 340/583 |
| 4,808,824 | 2/1989 | Sinnar | 250/339 |
| 5,014,042 | 5/1991 | Michoud et al. | 340/583 |

Primary Examiner—Galen Barefoot
Attorney, Agent, or Firm—Michael Lee; R. C. Kamp; R. B. Megley

[57] ABSTRACT

The invention provides an apparatus and method for detecting the presence of ice on a surface. The invention uses cameras to allow ice detection over a large area instead of a single point. The detecting apparatus provides an improved deicing apparatus.

24 Claims, 7 Drawing Sheets

FIG_1

FIG_3

FIG_5

FIG_4

FIG_6

FIG_7

FIG_8

FIG_9

FIG_10

FIG_11

APPARATUS FOR DEICING

The invention relates to an improved apparatus and method for detecting and viewing ice on deicing surfaces. In particular the invention may be used to detect and to deice aircraft or runways.

Ice on aircraft wings is a serious hazard because it disturbs the laminar airflow across the wings surface, causing loss of aerodynamic lift. Even an extremely thin layer of ice can seriously reduce lift. For example, an ice layer which is equivalent of 40-grain glass paper can reduce aerodynamic efficiency by 20%. This creates a potential air safety hazard. It is therefore desirable to have an ice detection system, which can detect a layer of ice as thin as or thinner than 40-grain glass paper.

The invention provides an apparatus and method for detecting the presence of ice on a surface. The detecting apparatus provides an improved deicing apparatus. The invention detects ice at a plurality of locations indicating which individual location has ice and which individual location does not have ice. Since a plurality of locations are monitored the invention provides a faster detection system.

An object of the invention is to provide a method and apparatus for determining whether an aircraft is unfit for operation because of an accumulation of ice.

Another object of the invention is to provide a method and apparatus for locating positions of icy areas on aircraft.

Another object of the invention is to provide a more efficient deicing method and apparatus.

Another object of the invention is to detect the presence of ice at a plurality of locations, instead of at a single point.

Another object of the invention is to quickly determine the presence of ice over a large area.

These and other advantages of the invention will become apparent from the following description of the embodiments and the accompanying drawings.

Figure 1:
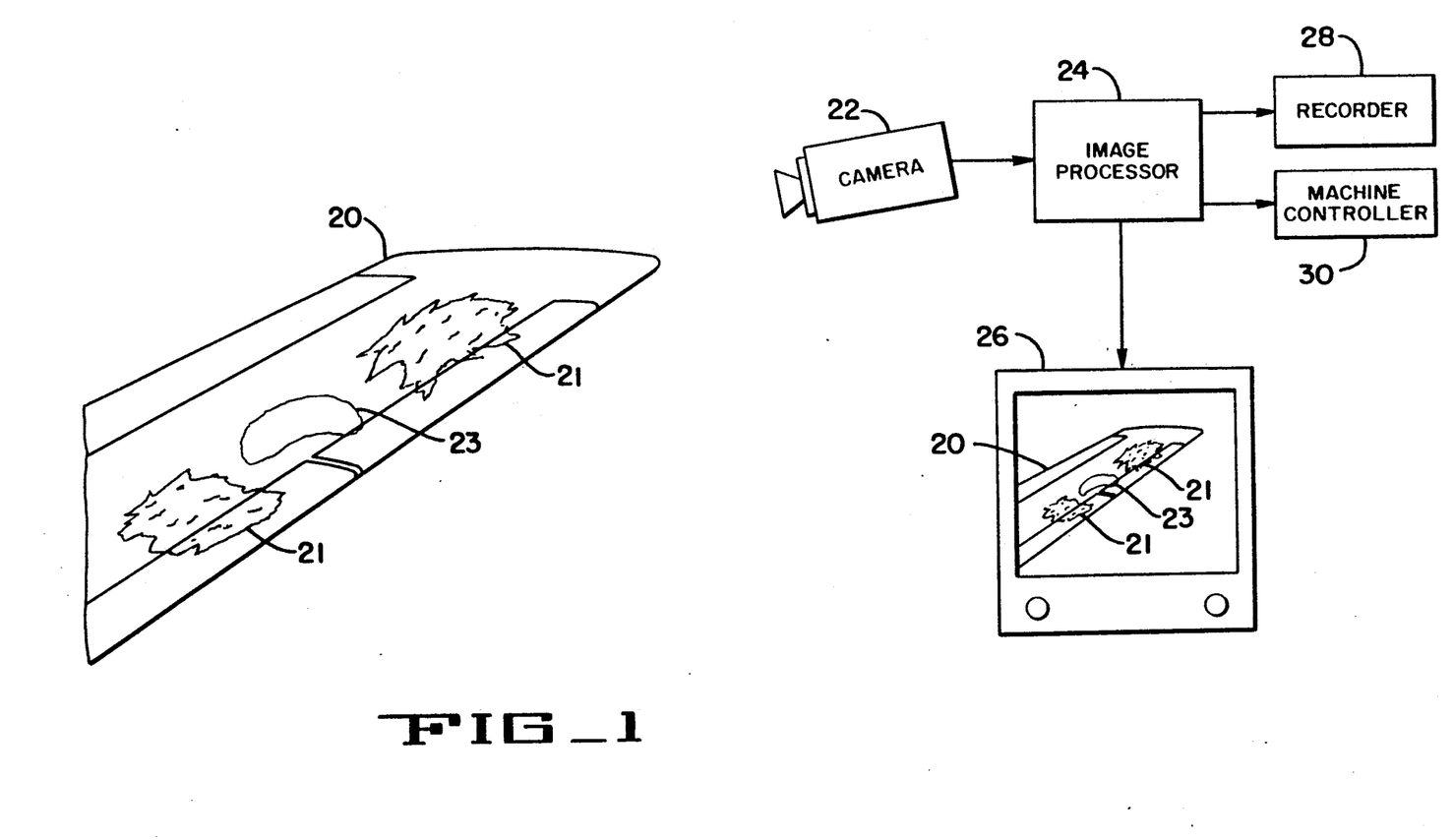
FIG. 1 illustrates an embodiment of an ice detecting system scanning an aircraft wing.

FIG. 1 illustrates an embodiment of the ice detecting apparatus, indicating the presence of ice 21 on an aircraft wing 20. An ice detecting camera 22 is directed towards the aircraft wing 20. The ice detecting camera 22 produces a signal which is processed by the image processor 24. The image processor 24 processes the signal from the ice detecting camera and sends an output signal to a color video monitor 26. The color video monitor 26 illustrates the wing of the aircraft in one color and the ice in another color indicating the areas with a surface of ice. The color monitor 26 may also illustrate other substances such as water 23 or the deicing chemical in other colors. In the alternative or in addition to sending a signal to the color video monitor 26, a signal is sent to a recorder 28 which records the signal from the image processor 24. The recorded signal would be useful as documentation to the status of the aircraft wing. All images would be recorded along with the date and time. In the alternative or in addition to sending a signal to the color video monitor 26 and recorder 28, a signal is sent to a machine controller 30 from the image processor 24. The machine controller 30 may control an alarm to notify the pilot of the presence of ice or an automatic deicer, which automatically deices icy surfaces.

Figure 2:
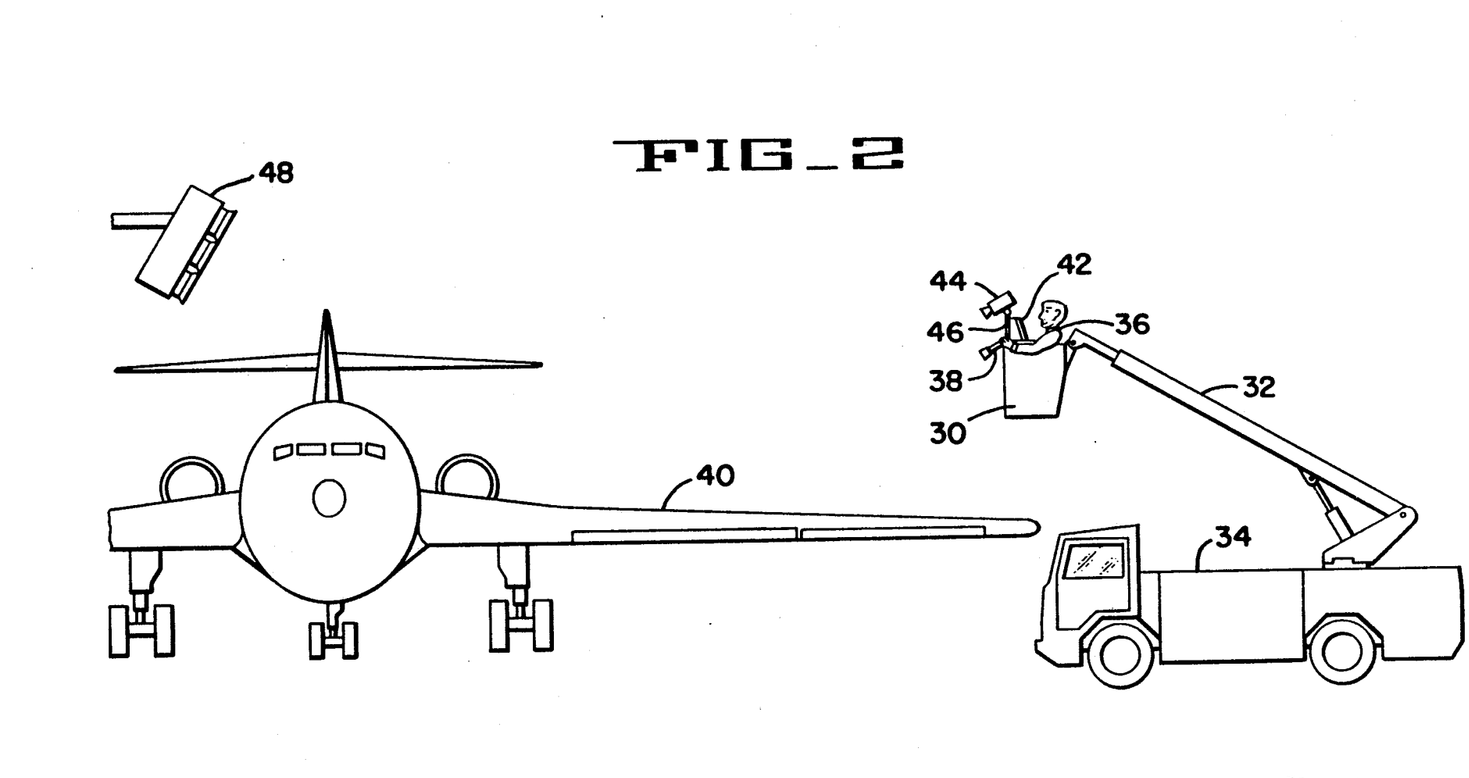
FIG. 2 illustrates a deicing vehicle inspecting an aircraft.

FIG. 2 illustrates an embodiment of the invention which comprises an ice detection system illustrated in FIG. 1 on a deicer vehicle. In this embodiment, a basket 30 is mounted on a boom arm 32, which is mounted on a deicer vehicle 34. This vehicle may be model TM-1800 made by FMC AED-Orlando, Fla. A person 36 in the basket 30 directs a deicing gun 38. The person 36 views the aircraft wing 40 through a color video monitor 42. The ice detecting camera 44 generates signals for the color video monitor 42 and is aligned with the deicing gun 38 so that when ice is aligned within the cross hairs of the color video monitor 42, the deicing gun 38 is directed at the ice. When ice is detected, it is removed by a manually directed blast of deicing chemical from the deicing gun 38. After spraying, the treated areas can be re-scanned to verify that all ice has been removed. The ice detecting camera 44 can be mounted on a telescoping pole 46 above the deicing gun 38, providing a separation between the deicing gun 38 and the ice detecting camera 44, so that the camera is protected from mist from the deicing gun 38. Other means instead of the telescoping pole 46 may be used to prevent the lens of the ice detecting camera 44 from accumulating mist from the deicing gun 38 or ice. During daylight operation, sunlight will provide sufficient illumination to operate the ice detecting camera. During night operation, conventional lamps 48 should provide sufficient illumination. In this embodiment, the signal from the ice detecting camera is also sent to a recorder, which records the signal for documentation. The video recorder is automatically switched on whenever the imager or deicer is in use.

Figure 3:
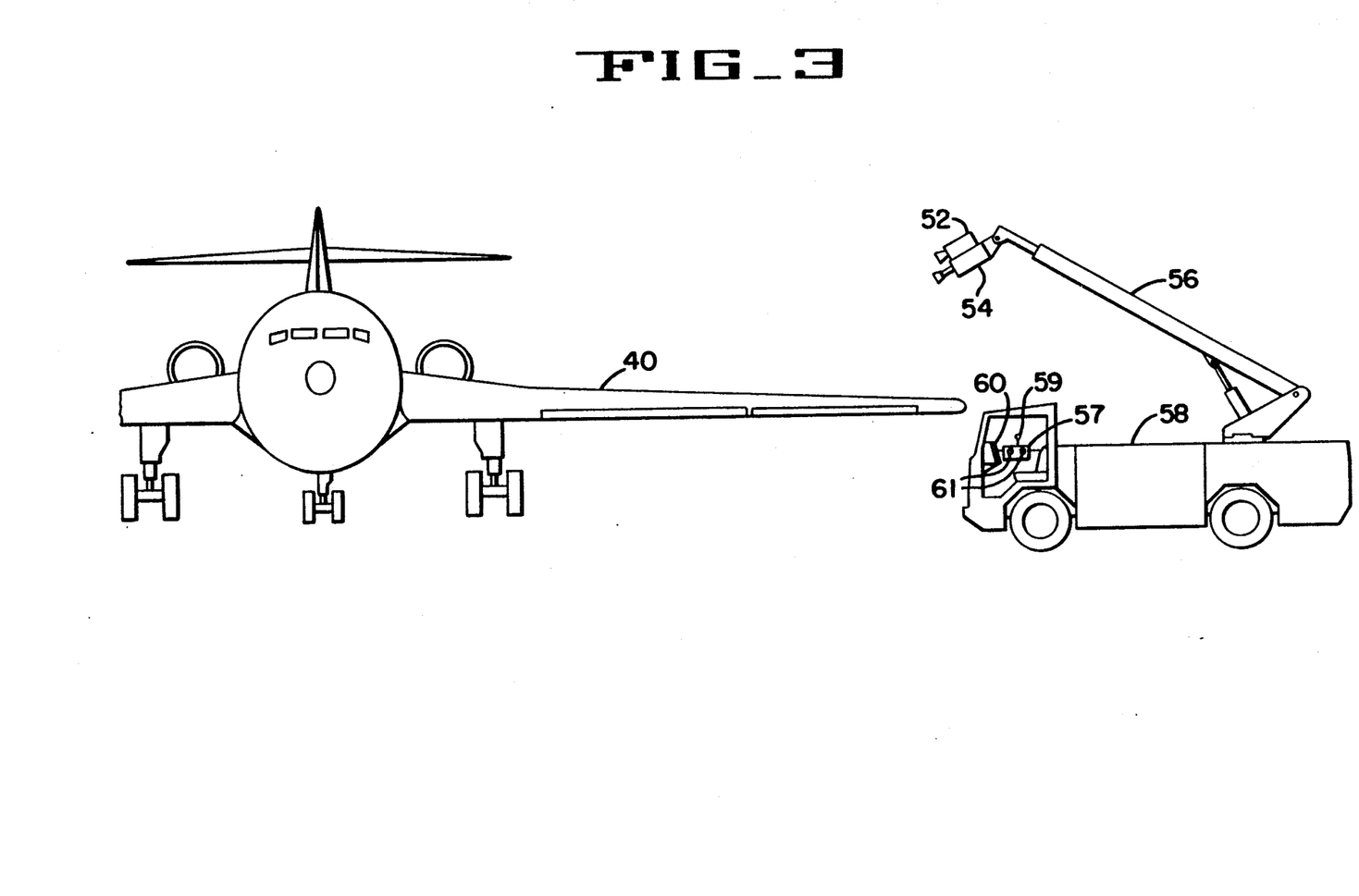
FIG. 3 illustrates another deicing vehicle inspecting an aircraft.

FIG. 3 illustrates another embodiment of the invention of an ice detection system illustrated in FIG. 1 on another deicer vehicle. In this embodiment, an ice detecting camera 52 and a deicing gun 54 are mounted on a boom arm 56. The boom arm 56 is mounted on a deicer vehicle 58. The color video monitor 60, which displays the icy surfaces is located in the cab of the deicer vehicle 58 so that it can be viewed by the driver of the deicer vehicle 58. A manual remote control device 57, which comprises a joystick 59 and a plurality of buttons 61, is also located in the cab of the deicer vehicle 58, which would allow the driver of the deicer vehicle 58 to aim the camera 52 and deicer gun 54 and control deicing blasts from the deicer gun 54. This embodiment allows the operator to stay inside the warm cab of the deicer vehicle 58. The productivity of in-cab deicers may also be better because the operator is not required to climb in and out of the basket. It is expected that this will shorten transportation time between aircraft.

Figure 4:
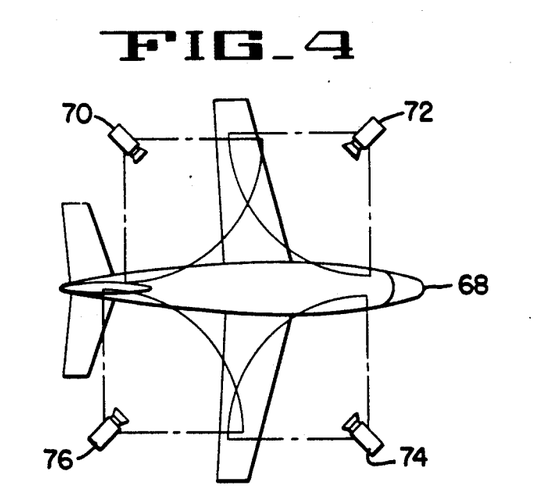
FIG. 4 illustrates a deicing pattern for an embodiment of the invention illustrated in FIG. 3.

In another embodiment of the invention, an automated system is added to the remote control system, which would provide supervised automatic operation of the deicer. The automated system is a computer which controls the movement of the ice detecting camera 52 and the deicing gun 54. In this embodiment the computer and a keyboard may either replace or be used in addition to the joystick 59 and the plurality of buttons 61 to control the detecting camera 52 and the deicing gun 54. The computer has a video analysis circuit which is programmed to seek and remove all ice within its reach. FIG. 4 helps illustrate the operation of the automated system. In operation, the driver first selects the type of aircraft (B-737, DC-9, etc.) 68 from a menu displayed on the color video monitor (operating as a computer terminal monitor). The color video monitor displays a graphic plan of the aircraft 68, showing the predetermined truck positions for optimum deicing. The operator drives the vehicle to the first inspection position 70 near the aircraft 68 and presses the "operate" button. The system scans all visible aircraft surfaces for signs of ice. When ice is found, the system removes it and scans again to verify that the ice is completely removed. After all surfaces are cleared, a "next station" message is displayed, indicating that the operator should drive the truck to the second station 72. At the second station 72, the same scanning process is repeated again. This process proceeds at the third and fourth stations 74,76 until the entire the aircraft 68 has been covered. This embodiment provides a consistent procedure that is applied to all aircraft, which is worked out in advance by experts. This embodiment of the invention also provides faster operation, since the scanning and deicing would be performed at a rapid rate, and the predetermined procedures would help achieve optimal performance. This embodiment of the invention will also require less sophistication of the operators, since the operation of the equipment is simpler and thus less training will be required.

Figure 5:
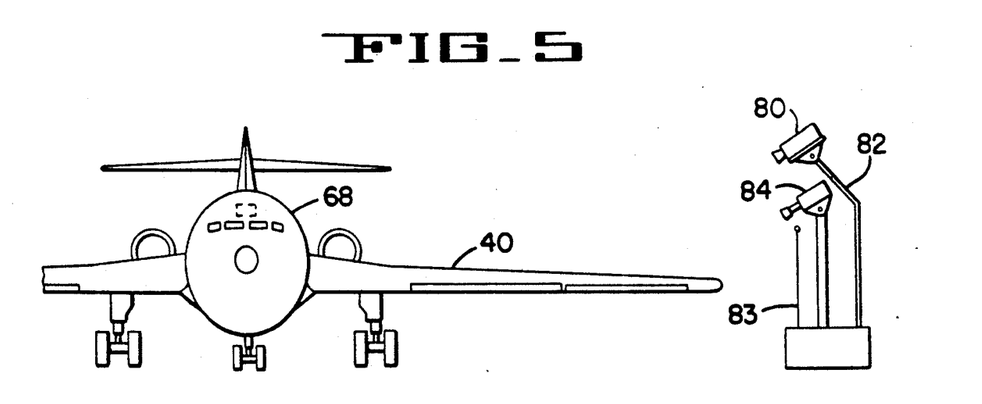
FIG. 5 illustrates an end of runway ice inspection system.

FIG. 5 illustrates another embodiment of the invention in the form of an end of runway inspection and deicing station. This embodiment comprises an ice detecting camera 80 on a boom arm 82, and an antenna 83 which provides radiowave communication between the cockpit of an airplane and the inspection and deicing station. The inspection station is located near the end of the runway, where airplanes are ready for takeoff. The pilot activates the ice detecting camera 80 and views the image on a video screen in the aircraft cockpit. The ice detecting camera 80 provides information directly to the pilot of the aircraft and the ground control tower, and the image would be archived on video tape. The camera is fitted with pan, zoom and focus controls which are actuated from the aircraft cockpit. A "touch-up" deicer spray head 84 is mounted near the camera station and also controlled by the pilot. This would operate in a manner similar to a car wash where every plane could be scanned and, if necessary, deiced, immediately before takeoff. Two or more stations may be required to insure full coverage of all aircraft. The pilot would switch between them to see all views. Note that when there is no aircraft present, the camera can be used to monitor for the presence of ice on the runway or taxiway surface.

Figure 6:
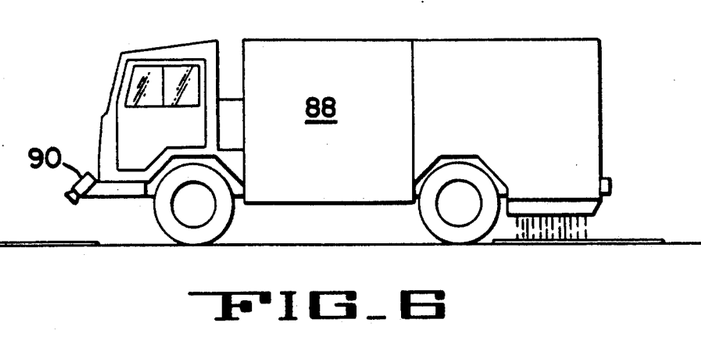
FIG. 6 illustrates a runway or roadway deicer.

FIG. 6 illustrates another embodiment of the invention to provide roadway or runway deicing. This embodiment comprises road clearing truck 88 with an ice detection system illustrated in FIG. 1. The road clearing truck 88 has an ice detecting camera 90 mounted in front of the truck 88, to detect ice in front of the truck 88. A color video monitor is mounted in the cab of the truck 88 to allow the driver to view the color video monitor. In operation the truck is driven forward 88, where the ice detecting system detects icy surfaces. The truck applies sand, salt, or other deicing chemical only to icy areas. An automated control dispenses an anti-ice chemical only on the detected icy areas to reduce wastage. This embodiment could significantly reduce the amount of deicing chemicals needed while clearing roads minimizing costs and environmental damage.

Figure 7:
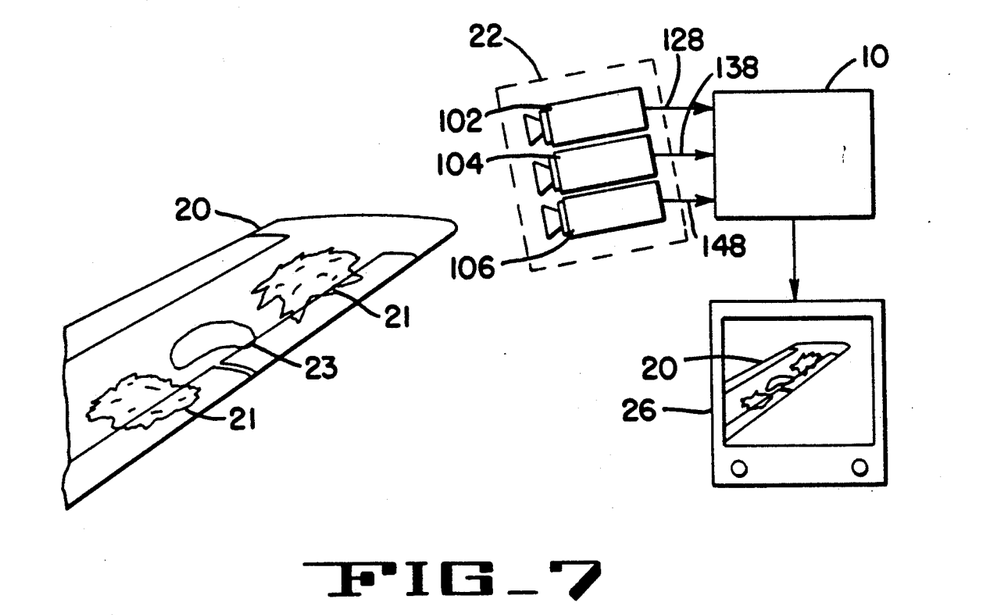
FIG. 7 illustrates a more detailed view of the embodiment in FIG. 1.
Figure 8:
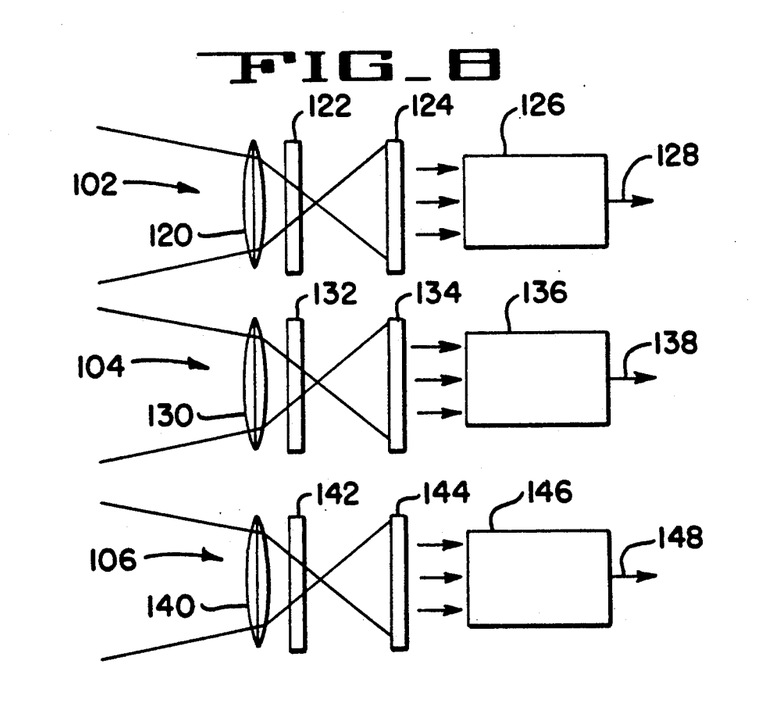
FIG. 8 illustrates a more detailed view of the ice detecting camera in FIG. 7.

FIG. 7 illustrates an embodiment of the ice detecting system illustrated in FIG. 1 with identical components sharing the same number. The embodiment comprises a first camera 102, second camera 104, and third camera 106, forming the ice detecting camera 22, where each camera sends a signal to an image processor 10 which sends a signal to a color video monitor 26. FIG. 8 illustrates the first camera 102, second camera 104, and third camera 106 illustrated in more detail. The first camera 102 comprises a first lens 120, a first filter 122, a first imager 124, and a first video generator circuit 126, which produces a first video channel 128. The second camera 104 comprises a second lens 130, a second filter 132, a second imager 134, and a second video generator circuit 136, which produces a second video channel 138. The third camera 106 comprises a third lens 140, a third filter 142, a third imager 144, and a third video generator circuit 146, which produces a third video channel 148. The first filter 122 allows a broad spectrum in the visible range to pass to the imager 124. The second filter 132 allows a first narrow band in the infrared region, as specified below, to pass to the imager 134. The third filter 142 allows a second narrow band in the infrared region, as specified below, to pass to the imager 144, wherein the center wavelength of the first narrow band is different than the center wavelength of the second narrow band. In this embodiment, the imagers 124,134,144 are commercial video imagers selected for their sensitivity at desired optical frequencies, such as a vidicon type camera with a PbO-PbS photoconductive target. Two examples of commercial imagers which can be used are the model N2606-06 infrared vidicon and the 2741-03 camera manufactured by Hamamatsu Photonics of Hamamatsu City, Japan. The fields of view of the first camera 102, second camera 104, and third camera 106 are substantially identical so that the images generated are precisely registered and a single object will appear at substantially the same XY image coordinate in each image. The cameras 102,104,106 are electronically synchronized (genlocked) so that their raster scanning pattern takes place at the same time, in step. This spatial and temporal registration is used to detect ice on a specific object.

The filter 132 of the second camera 104 is chosen to pass the first narrow band, wherein the first narrow band is centered at a wavelength which corresponds to a dip in the spectrum of reflected light from ice. Ice has dips in its reflectance spectra at 1.25, 1.6 and 2.0 microns. The filter 142 of the third camera 106 is chosen to pass the second narrow band, wherein the second narrow band is centered at a wavelength which corresponds to a peak in the reflectence spectra of ice. Ice has peaks in its reflectance spectra at 1.8 microns. In this embodiment of the invention the filter 132 of the second camera 104 is chosen to pass the first narrow band centered at 1.6 microns, and the third filter 144 of the third camera 106 is chosen to pass the second narrow band centered at 1.8 microns. These wavelengths are used as examples. A better combination of wavelengths may exist.

The image processor 10 creates a genlock signal to which the first video generator circuit 126, the second video generator circuit 136, and the third video generator circuit 146 are synchronized. The first video generator circuit 126, the second video generator circuit 136, and the third video generator circuit 146 each produce an RS-170 standard (monochrome) video signal synchronized to the genlock signal. Synchronizing the signals from the first video generator circuit 126, the second video generator circuit 136, and the third video generator circuit 146 to genlock keeps the scan pattern of the first, second, and third imagers 124,134,144 in mutual synchronization, so that the signals from the first video generator circuit 126, the second video generator circuit 136, and the third video generator circuit 146 can be treated as if they were a single tri-stimulus (RGB) color signal. In this embodiment, the signal from the first video generator circuit 126 is treated as input for a blue signal, the signal from the second video generator circuit 136 is treated as input for a green signal, and the signal from the third video generator circuit 146 is treated as input for a red signal.

In operation, the entire wing may reflect most of the broad spectrum of light, which is imaged by the first camera 102 causing an intense blue signal covering the entire wing on the color video monitor 26. Surfaces of ice and certain other substances on the wing would reflect a spectrum of light with a peak at 1.8 microns, which would be imaged by the second camera 104 causing an intense green signal at those areas with icy surfaces or certain other substances on the color video monitor 26. Surfaces of the certain other substances but not ice would reflect a higher intensity light at a frequency of 1.6 microns than would the icy surface causing those areas to produce a higher a brighter red signal on the color video monitor 26. Therefore, on the color video monitor 26 the entire wing 20 would have a blue color. Icy surfaces 21 and certain other substances 23 on the wing would have in addition a green color. Surfaces of the certain other substances 23 on the wing would in addition have a red color. As a result, on the color monitor the parts of the wing without icy surfaces or certain other substances would show in blue, the icy surfaces on the wing would show in blue added to green making yellow on an RGB monitor, and surfaces of certain other substances on the wing would show in blue added to green added to red, which would make white on an RGB monitor. Therefore the icy surfaces are easily seen as yellow on the color monitor 26 making the icy surface easy to detect.

This embodiment allows visual discrimination of ice from water by exploiting the natural spectral shift which occurs when water freezes. The spectral signatures (the reflectence spectra) of water and ice (frozen $H_2O$) are not identical, even though both substances appear transparent to the eye, especially in thin layers. The use of spectral techniques to identify different compounds is employed in modern chemical analysis laboratories. Spectral signatures are also used in agriculture to sort tomatoes and other fruit as described in U.S. Pat. No. 3,206,022 incorporated by reference. In this invention, ratios of the reflected energy within predetermined bands are made at many points over a large electronic image. These ratiometric data are in turn transformed into a displayable image which is used to highlight areas of interest on a conventional video image.

The cameras may optionally be fitted with pan, zoom and focus controls which simultaneously change their fields of view in sync with each other. Automatic controls are especially useful in remotely controlled (teleoperated) and automatic (robotic) deicer applications.

Figure 9:
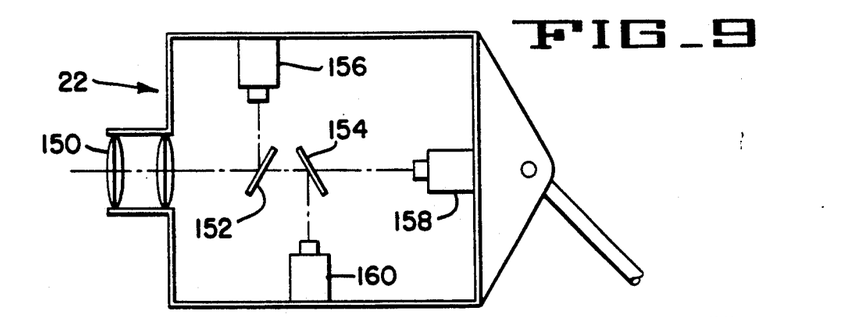
FIG. 9 illustrates an embodiment of the ice detecting camera.

FIG. 9 illustrates another embodiment of the ice detecting camera 22 illustrated in FIG. 1. This embodiment uses a single lens device 150. The single lens device 150 must be able to admit light of all the necessary frequencies. Along an optical path from the lens device 150 is a first half silvered mirror 152 which is angled to split the optical path into two optical paths. Along one optical path from the first half silvered mirror 152 is a second half silvered mirror 154, which is angled to split the optical path into two optical paths. As a result three optical paths are created. A first imager 156 is placed at the end of a first optical path, a second imager 158 is placed at the end of a second optical path, and a third imager 160 is placed at the end of a third optical path. This configuration allows a single focusing, rotating and zooming mechanism for the first 156, second 158, and third 160 imagers. It also allows the first 156, second 158, and third 160 imagers to image the same area simultaneously. This embodiment also provides a single swivel point, which moves each imager 156,158,160 simultaneously. In this embodiment, the first imager 156 and the lens device 150 form a first camera, and the second imager 158, which has a filter, and the lens device 150 form a second camera, and the third imager 160, which has a filter, and the lens device 150 form a third camera. Each the first, second, and third imagers 156,158,160 may each have their own lenses, thus making each imager a separate camera. In this case, the lens device would be used as a single zoom lens or for similar functions.

Figure 10:
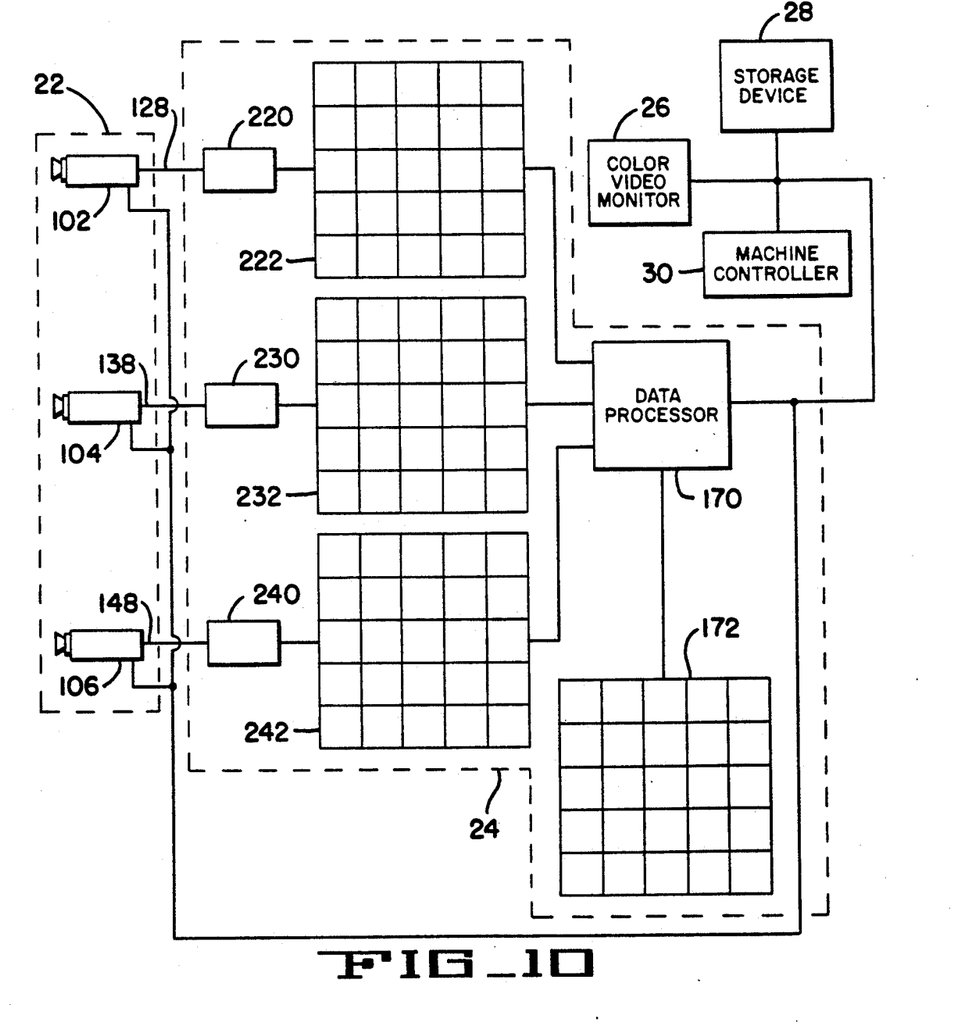
FIG. 10 is a schematic illustration of a digital ice detection system.

FIG. 10 illustrates a digital embodiment of the ice detecting system illustrated in FIG. 1. In this embodiment the ice detecting camera 22 can be identical to the ice detecting camera 22 used in FIGS. 7 and 8, wherein identical parts are similarly numbered. Therefore the ice detecting camera 22 in this embodiment comprises a first camera 102, a second camera 104 and a third camera 106. The first camera 102 produces a first video channel 128 which is fed to a first video digitilizer 220. The second camera 104 produces a second video channel 138 which is fed to a second video digitilizer 230. The third camera 106 produces a third video channel 148 which is fed to a third video digitilizer 240. The first video digitilizer 220 converts on a pixel by pixel basis the video image to a first digitalized image matrix 222. In this embodiment the first digitalized image matrix 222 comprises a $512 \times 512$ matrix where each element in the matrix is a eight bit number, which is shown in the drawing as a $5 \times 5$ matrix for clarity. The second video digitilizer 230 converts on a pixel by pixel basis the video image to a second digitalized image matrix 232. In this embodiment the second digitalized image matrix 232 comprises a $512 \times 512$ matrix where each element in the matrix is a eight bit number, which is shown in the drawing as a $5 \times 5$ matrix for clarity. The third video digitilizer 240 converts on a pixel by pixel basis the video image to a third digitalized image matrix 242. In this embodiment the third digitalized image matrix 242 comprises a $512 \times 512$ matrix where each element in the matrix is a eight bit number, which is shown in the drawing as a 5×5 matrix for clarity. Data from the first, second, and third, digitalized image matrices 222,232,242 are temporarily or permanently stored in a data processor 170, which analyzes the data from the first, second, and third image matrices 222,232,242 and from the data creates a processed image matrix 172. Data from the processed image matrix 172 is used by the data processor 170 to create an output signal to a color video monitor 26, a recorder 28, or a machine controller 30. The data processor 170 also sends a genlock signal to the first, second and third cameras 102,104,106 to synchronize them.

To simplify the understanding of the invention the first, second, and third cameras 102,104,106 in this embodiment are the same as the first, second, and third cameras 102,104,106 in the embodiment in FIG. 8, which is why they are similarly numbered. The first camera 102 measures the intensity of all visible light, the second camera 104 measures the intensity of a narrow band of infrared light centered around 1.6 microns, and the third camera 106 measures the intensity of a narrow band of infrared light centered around 1.8 microns. Each element in the first digitalized image matrix 222 indicates the intensity of visible light at a corresponding pixel point. Each element in the second digitalized image matrix 232 indicates the intensity of a narrow band of infrared light centered around 1.6 microns. Each element in the third digitalized image matrix 242 indicates the intensity of a narrow band of infrared light centered around 1.8 microns.

The data processor 170 compares the values in the first, second, and third digitalized image matrix 22,232,242 to generate an image matrix 172. In this embodiment, a low value in an element in the first digitalized image matrix 222 will be used to designate the absence of a wing or other aircraft surface viewed at the corresponding pixel. A high value in an element in the first digitalized image matrix 222 will be used to designate the presence of a wing or other aircraft surface viewed at the corresponding pixel. In this embodiment, a high value for an element in the first digitalized image matrix 222 with a high value for the corresponding element in the third digitalized image matrix 242 with a low value for the corresponding element in the second digitalized image matrix 232 is used to indicate ice on the wing or other aircraft surface viewed at a corresponding pixel. Other combinations of having a high value in an element of the first digitalized image matrix 222 and values in corresponding elements of the second and third digitalized image matrices 232,242 indicate a wing or another aircraft surface without ice. One way of determining if there is a high value in an element of the third digitalized matrix 242 and a low value in the corresponding element in the second digitalized matrix 232 is by dividing the value in the element in the third digitalized image 242 by the value in the corresponding element in the second digitalized image matrix 232 and determining if the new value is greater than a specified number. Data from the processed image matrix 172 is used by the data processor 170 to generate a video signal, which is sent to the color video monitor 26, storage device 28, or machine controller 30. Different colors from the video signal correspond to the different values in the elements of the processed image matrix 172.

Figure 11:
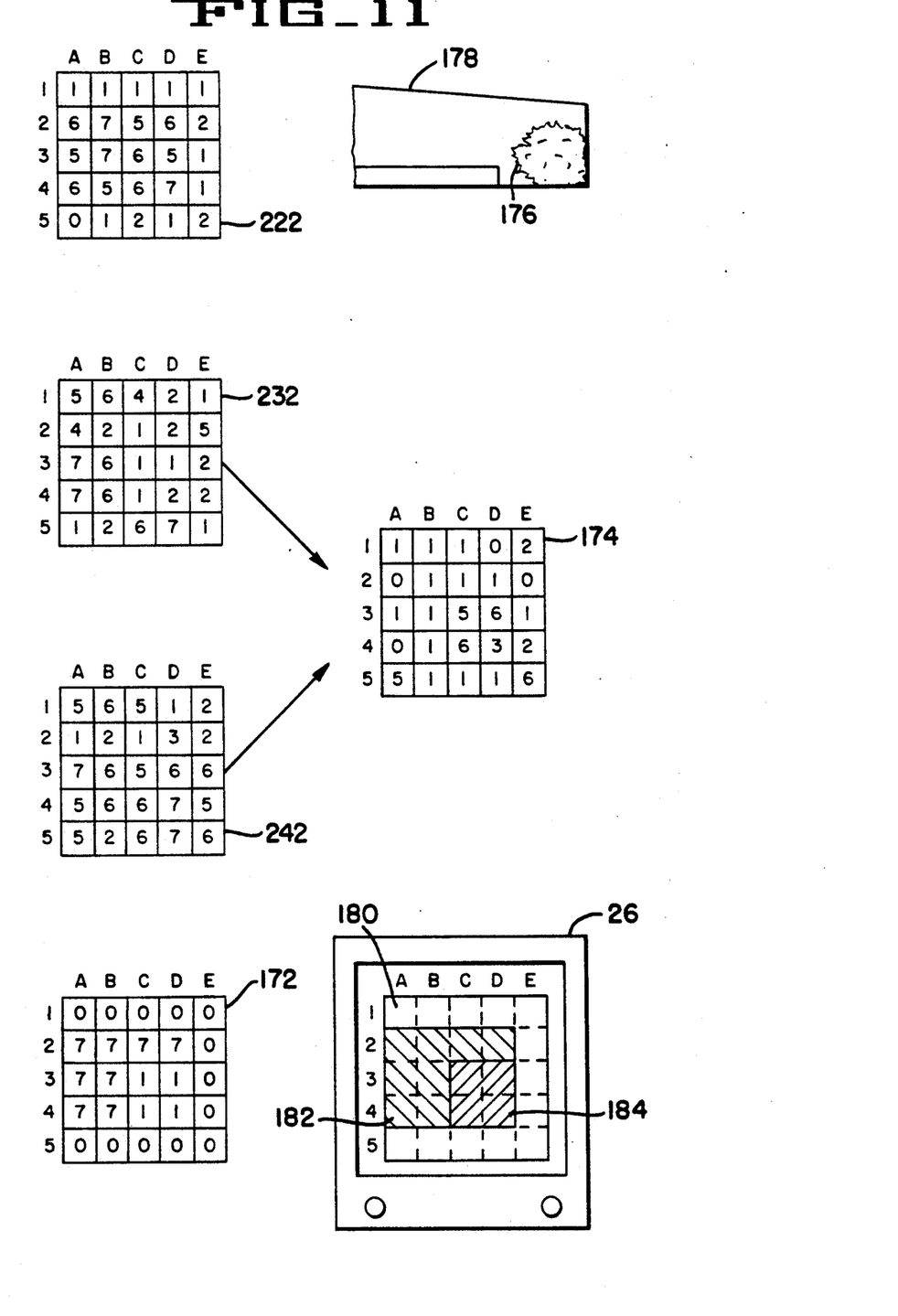
FIG. 11 illustrates a example of the embodiment illustrated in FIG. 10.

FIG. 11 are example matrices of how in one embodiment the first, second, and third digitalized image matrices 222,232,242 are used to generate a processed image matrix 172. To simplify the explanation of the example, instead of the first, second, and third digitalized image matrices 222,232,242 being 512×512 matrices with 8 bits per element, the example will use 5×5 matrices with a one digit number in base ten. Using the embodiment illustrated in FIG. 10, FIG. 11 is illustrative of how an airplane wing 178 with an icy surface 176 is imaged.

The first camera 102 indicates that the airplane wing 178 provides a higher intensity broad visible spectrum reflection with the area surrounding the wing 178 providing a very low intensity reflection. In the first digitalized image matrix 222 generated from the data provided by the first camera 102, elements A1, B1, C1, D1, E1, E2, E3, E4, E5, D5, C5, B5, and A5 are given low values, which are less than 3, since they correspond to pixels which measure reflected visible light from the area surrounding the wing 178, which is has a low intensity. In the first digitalized matrix elements A2, B2, C2, D2, A3, B3, C3, D3, A4, B4, C4, and D4 have high values, which are greater than 3, since these elements correspond to pixels which measure the reflected visible light from the wing 178 which has a high intensity.

The second camera 104 measures the intensity of reflected infrared light in a first narrow band which is centered at 1.6 microns. 1.6 microns is a wavelength at which ice reflects a low intensity of light. Elements E1, B2, C2, D2, C3, E3, D3, C4, D4, E4, A5, B5 and E5 of the second digitalized matrix 232 are given low values, which are less than 3. They are considered as possibly locating positions of ice, since they correspond to pixels that receive a low intensity of the first narrow band.

The third camera 106 measures the intensity of reflected infrared light in a second narrow band which is centered at 1.8 microns. 1.8 microns is a wavelength at which ice reflects a high intensity of light. Elements A1, B1, C1, A3, B3, C3, D3, E3, A4, B4, C4, D4, E4, A5, C5, D5, and E5 of the third digitalized matrix 242 are given high values, which are greater than 4. They are considered as possibly locating positions of ice, since they correspond to pixels that receive a high intensity of the second narrow band.

The data processor uses the second digitalized matrix 232 and the third digitalized matrix 242 to create a quotient matrix 174. Each element in the quotient matrix is the quotient of the value of the corresponding element in the third image matrix 242 divided by the value of the corresponding element in the second image matrix 232 rounded down or truncated to the nearest whole number.

In this embodiment, the data processor 170 uses the following algorithm, which uses the first digitalized image matrix 222 and the quotient matrix 174 to create the processed image matrix 172. In the algorithm, for an element in the image matrix 222 first the value in the corresponding element of the first digitalized image matrix 222 is checked. If the value in the corresponding element of the first digitalized matrix 222 is less than 3, then a value of 0 is placed in the element in the processed image matrix 172 and the next element is evaluated. If the value in the corresponding element of the first digitalized matrix 222 is not less than 3, then the corresponding value in the quotient matrix 174 is checked. If the value of the corresponding element in the quotient matrix is greater than or equal to 2 then a value of 1 is placed in the element of the processed image matrix 172. If the value of the corresponding element of the quotient matrix 174 is less than 2 then a value of 7 is placed in the element.

In the example shown in FIG. 11, elements A1, B1, C1, D1, E1, E2, E3, E4, E5, D5, C5, B5, and A5 are given a value of 0, since they correspond to elements in the first image matrix 222 with values less than 3, which corresponds to pixels measuring light from areas surrounding the wing 178. The remaining elements correspond to elements in the first digitalized matrix 222 which have values which are not less than 3, therefore for these remaining elements corresponding elements in the quotient matrix 174 must be checked to determined the values they are to be given. Elements C3, D3, C4, and D4, in the quotient matrix 174 have values that are greater than 2, so a value of 1 is assigned to the corresponding elements in the processed image matrix 172. The values greater than or equal to 2 in the quotient matrix 174 result from values in corresponding elements of the third digitalized image matrix 242 being high and the values in corresponding elements of the second digitalized matrix 232 being low. This indicates ice, since the high value in the third digitalized image matrix 242 indicates that a high intensity of light at a narrow band centered at 1.8 microns is measured at the corresponding pixel, wherein ice has a high reflectance at this narrow band, and the low value in the corresponding element of the second digitalized matrix 232 indicates that a low intensity of light at a narrow band centered at 1.6 microns is measured at the corresponding pixel, wherein ice has a low reflectence at this narrow band. Elements A2, B2, C2, D2, A3, B3, A4, and B4 correspond to elements in the quotient matrix with values that are less than 2, therefore these elements in the processed image matrix are given a value of 7.

The data processor 170 uses the processed digitalized matrix 172 to generate a video signal or a signal for a machine controller. For elements in the processed digitalized matrix 172 with a value of 0, the data processor 170 uses a look up table to determine that the video output would cause the pixels on a video color monitor 26 to be black. For elements in the processed digitalized matrix 172 with a value of 7, the data processor 170 uses a look up table to determine that the video output would cause the pixels on a video color monitor 26 to be white. For elements in the processed digitalized matrix 172 with a value of 1, the data processor 170 uses a look up table to determine that the video output would cause the pixels on a video color monitor 26 to be red. Thus, as shown on the monitor 26 in FIG. 11, the area surrounding the wing shows up in black 180, the icy surface on the wing shows up in red 184, and the remainder of the wing shows up in white 182, making the icy area easy to detect.

Instead of generating a video image, a machine controller 30 could direct a deicing blast to areas corresponding to elements of the processed image matrix with a value of 1. After the blasts the area is re-scanned to check for ice.

A digitalized embodiment which uses eight bits instead of the 3 used in the above simplified example would allow a greater variety of hues and colors. Digitalization provides more flexibility than the analog embodiment.

The digitalized embodiment also allows a fourth or fifth or more cameras, which would measure the intensities of other narrow bands. This would allow the an easier and more accurate measurement of the thickness of the ice. Also several other chemicals besides ice can be indicated.

In the specification and claims, a camera is defined as an apparatus or device with a lens, a means for detecting the intensity of light reflected from a plurality of locations and a means for generating a signal which indicates individual intensities of light from each individual location. A lens can be any defractive or refractive means such as a pin hole camera or one or more glass or plastic lenses. Some possible cameras which can be used in the invention are raster scan cameras, charge coupled device cameras, charge injection devices, which may use inter line transfer, and line scan cameras.

While a preferred embodiment of the present invention has been shown and described herein, it will be appreciated that various changes and modifications may be made therein without departing from the spirit of the invention as defined by the scope of the appended claims. MBL:lu

We claim:
1. An apparatus, comprising:
    an ice detecting camera, comprising:
        a first camera for producing a first signal corresponding to the intensity of reflected light in a first narrow band centered near a wavelength at which ice has a low reflectence; and
        a second camera for producing a second signal corresponding to the intensity of reflected light in a second narrow band centered near a wavelength at which ice has a high reflectence; and
        means for receiving the first signal and the second signal, processing the first and second signals, and producing an ice indicator signal.
2. An apparatus, as claimed in claim 1, wherein the first camera comprises:
    a filter which passes the first narrow band;
    a lens;
    a means for detecting the intensity of reflected light from a plurality of locations; and
    a means for generating a signal which indicates individual intensities of reflected light from each individual location of the plurality of locations, and wherein the second camera comprises;
    a filter which passes the second narrow band;
    a lens;
    a means for detecting the intensity of reflected light from a plurality of locations; and
    a means for generating a signal which indicates individual intensities of reflected light from each individual location of the plurality of locations.
3. An apparatus, as claimed in claim 2, wherein the ice detecting camera further comprises a third camera for producing a third signal corresponding to the intensity of reflected light from a broad spectrum of visible light wherein the third signal is also received and processed by the means for receiving the first and second signals.
4. An apparatus, as claimed in 3, further comprising; means for rastering the first, second, and third cameras across the plurality of locations synchronously; and
    a color video monitor which receives the ice indicator signal.
5. An apparatus, as claimed in claim 4, further comprising a means for recording the ice indicating signal.
6. An apparatus, as claimed in claim 4, further comprising a deicing apparatus mechanically attached to the ice detecting camera.

7. An apparatus, as claimed in claim 6, wherein the deicing apparatus is a means for spraying deicing chemicals on some of the plurality of locations.

8. An apparatus, as claimed in claim 4, further comprising:
a vehicle;
a boom arm with a first end and a second end, wherein the first end of the boom is attached to the vehicle;
a basket mechanically attached to the second end of the boom arm; and
a deicing gun for spraying a deicing chemical, mechanically mounted on the basket wherein the ice detecting camera is mechanically attached to the basket and the color video monitor is mechanically attached to the basket.

9. An apparatus, as claimed in claim 4, further comprising:
a vehicle with a cab;
a boom arm with a first end and a second end, wherein the first end of the boom is attached to the vehicle;
a deicing gun for spraying a deicing chemical mechanically attached to the second end of the boom arm wherein the ice detecting camera is mechanically attached to the deicing gun.

10. An apparatus, as claimed in claim 9, further comprising, manual controls located in the cab, wherein the manual controls can aim the deicing gun and camera and operate the deicing gun, and wherein the color video monitor is located in the cab.

11. An apparatus, as claimed in claim 10, further comprising a means for moving the ice detecting camera and deicing gun in a programmed manner and causing the deicing gun to spray in a programmed manner.

12. An apparatus, as claimed in claim 4, further comprising:
a station;
a boom arm with a first end and a second end, wherein the first end of the boom arm is mechanically connected to the station and wherein the ice detecting camera is mechanically connected to the second end of the boom arm;
a first antenna electrically and mechanically connected to the station;
a second antenna;
a control mechanism;
a means electrically connected between the control means and the second antenna for receiving a signal from the control means and sending a signal through the second antenna to the first antenna;
means electrically connected between the first antenna and the ice detecting camera for receiving a signal from the ice detecting camera and sending a signal through the first antenna to the second antenna; and
means electrically connected between the second antenna and the color video monitor for receiving the signal on the second antenna sent from the first antenna and processing the signal to produce an image on the color video monitor.

13. An apparatus, as claimed in claim 12, further comprising a deicing gun mechanically connected to the station.

14. An apparatus, as claimed in claim 2, further comprising a means for deicing some of the plurality of locations.

15. An apparatus, as claimed in claim 14, wherein the means for deicing comprises means for dispersing deicing chemicals to some of the plurality of locations.

16. An apparatus, as claimed in claim 15, further comprising:
a vehicle with a front wherein the ice detecting camera is attached to the front of the vehicle; and
an electrical and mechanical means for controlling the deicing means, wherein whenever ice is detected by the ice detection camera the controlling means causes the deicing means to disperse deicing chemicals to the plurality of locations.

17. An apparatus, as claimed in claim 2, wherein the first narrow band is centered substantially around 1.8 microns.

18. An apparatus, as claimed in claim 17, wherein the second narrow band is centered substantially around 1.6 microns.

19. An apparatus, as claimed in claim 17, wherein the second narrow band is centered substantially around 2.0 microns.

20. A method, comprising the steps of:
generating a first signal which indicates individual intensities of reflected light in a first narrow band, centered near a wavelength at which ice has a low reflectence, from each individual location of a plurality of locations;
generating a second signal which indicates individual intensities of reflected light in a second narrow band, centered near a wavelength at which ice has a high reflectence, from each individual location of the plurality of locations;
receiving the first signal and the second signal;
processing the first and second signals; and
producing a signal that indicates the presence or absence of ice at each of the plurality of locations.

21. A method, as claimed in claim 20, wherein:
the step of generating a first signal, comprises the steps of:
focusing some of the reflected light;
filtering the focused light, leaving only the first narrow band; and
imaging the filtered light; and
the step of generating a second signal, comprises the steps of:
focusing some of the reflected light;
filtering the focused light, leaving only the second narrow band; and
imaging the filtered light.

22. A method, as claimed in claim 21, further comprising the step of generating a third signal which indicates individual intensities of reflected light in a broad spectrum from each individual location of the plurality of locations.

23. A method, as claimed in claim 21, further comprising the step of deicing the locations where the presence of ice is indicated.

24. A method as claimed in claim 23, wherein the step of deicing comprises the step of dispensing deicing chemicals to the locations where the presence of ice is indicated.

* * * * *